United States Patent [19]

Lewis, Jr.

[11] Patent Number: 4,506,291
[45] Date of Patent: Mar. 19, 1985

[54] TELEVISION RECEIVER WITH DIGITAL SIGNAL PROCESSING HAVING A DIGITAL-TO-ANALOG CONVERTER CONTROL CAPABILITY

[75] Inventor: Henry G. Lewis, Jr., Hamilton Square, N.J.

[73] Assignee: RCA Corporation, New York, N.Y.

[21] Appl. No.: 402,836

[22] Filed: Jul. 29, 1982

[51] Int. Cl.³ .......................................... H04N 9/535
[52] U.S. Cl. .................................................... 358/33
[58] Field of Search ................... 358/33, 26, 165, 171, 358/172, 21 R, 27, 28, 31

[56] References Cited

U.S. PATENT DOCUMENTS 4,219,838  8/1980  Rossi .
4,402,005  8/1983  Lewis, Jr. .............................. 358/28

FOREIGN PATENT DOCUMENTS 147087    11/1980  Japan ..................................... 358/26
2102644A   2/1983  United Kingdom .

OTHER PUBLICATIONS

Article, Electronic, Aug. 11, 1981, "Digital VLSI Breeds Next-Generation TV Receivers", by T. Fischer, pp. 97–103.
Pamphlet by Intermetall Semiconductors ITT, "A New Dimension—VLSI Digital TV System", Publically Available Prior to Filing Date of Subject U.S. patent application of H. G. Lewis, Jr.
Data Sheet from Analogic Corporation, "MP8308, MP8318, Ultrafast 8–Bit Video D/A Converters", copyright 1979.

Primary Examiner—Richard Murray
Attorney, Agent, or Firm—Eugene M. Whitacre; Paul J. Rasmussen; Joseph J. Laks

[57] ABSTRACT

In a television receiver with digital signal processing circuitry, a composite video signal is sampled by an analog-to-digital converter. A luminance processor responsive to the digital samples of the composite video signal develops digital luminance signals and a chrominance processor develops digital chrominance signals. A digital-to-analog converter coupled to the luminance and chrominance processors develops a plurality of analog output voltages representative of the luminance and chrominance information. A driver circuit converts the analog output voltages to drive signals that are applied to the cathode electrodes of a color picture tube to produce a display of the picture information contained in the composite video signal. A signal generator develops a control signal that is applied to a reset line of the digital-to-analog converter to establish the analog output voltages at predetermined levels. If the control signal, for example, is indicative of the blanking interval within the composite video signal, the predetermined levels established are ones that will produce a blank display.

10 Claims, 3 Drawing Figures

TELEVISION RECEIVER WITH DIGITAL SIGNAL PROCESSING HAVING A DIGITAL-TO-ANALOG CONVERTER CONTROL CAPABILITY

This invention relates to television display systems with digital signal processing circuitry that has a digital-to-analog control capability.

In digital television receivers, an analog baseband video signal is sampled and the samples converted to representative digital samples by an analog-to-digital converter. The digital samples are processed in a digital comb filter to produce digital samples representing separated luminance and chrominance information. The digital luminance and chrominance information containing samples are then processed in respective channels of a digital signal processing section. The digital signal processing section performs functions similar to those performed by the counterpart analog luminance and chrominance channels found in conventional television receivers.

Digital-to-analog converters convert the digital samples produced by the luminance and chrominance channels to analog signals representing the color image that is to be displayed. If the analog signals are the Y, I, and Q signals in an NTSC color system, these analog signals are matrixed to produce the R, G and B signals needed to drive the cathodes of a color picture tube.

A feature of the invention is the use of a digital-to-analog converter having outputs that may be set to predetermined voltage levels by a control signal. With such a D/A converter, functions, such as blanking or color kill, that were previously performed by analog circuitry can now be expeditiously performed, mainly by the digital signal processing circuitry, without the need for additional wiring to circuitry, such as the picture tube drive circuitry, which may be remotely located from the signal processing section of the television receiver.

Specifically in accordance with an aspect of the invention digital samples representative of image information are coupled to a digital-to-analog converter, which in response develops a corresponding analog output. A driver circuit responsive to the analog output signal develops the appropriate drive signal for the appropriate electrode of the picture tube to produce a display of the image. A signal generator develops a control signal that is applied to the digital-to-analog converter to maintain the analog output signal at a predetermined level.

FIG. 3 illustrates a portion of the digital signal processing circuitry of FIG. 1 that includes an analog signal control capability for color kill purposes in accordance with the invention.

Figure 1:
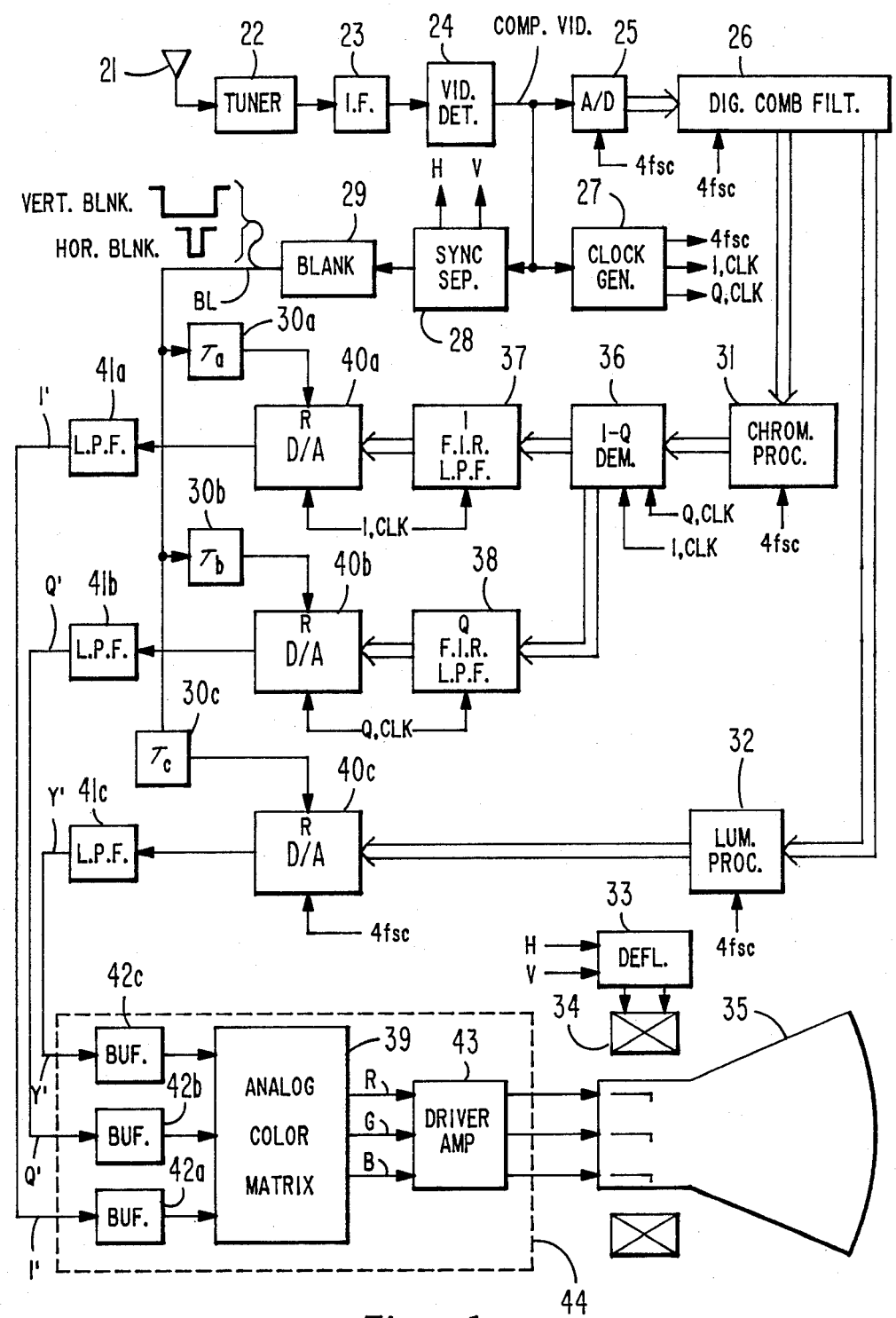
FIG. 1 illustrates a television receiver with digital signal processing circuitry that has an analog output signal control capability for blanking purposes in accordance with the invention.

In FIG. 1 a television signal is received by an antenna 21 and processed by a tuner 22, an intermediate frequency processing circuit 23, and a video detector 24 to produce in a conventional manner a composite video signal at the output of video detector 24. The analog composite video signal is applied to an input of an analog-to-digital (A/D) converter 25. The A/D converter 25 samples the video signal at a rate equal to four times the color subcarrier frequency ($4f_{sc}$), to produce digital samples of the video signal. Each digital sample may comprise, for example, an 8-bit word. The analog video signal will therefore be quantized to one of 256 discrete levels. The $4f_{sc}$ sampling clock signal for A/D converter 25 is developed by a clock generator 27 to enable the A/D converter to sample the analog video signal substantially in phase and frequency synchronism with the color burst signal contained within the video signal.

A sync separator 28 is responsive to the video signal provided by video detector 24 for generating horizontal and vertical sync pulses applied to a deflection unit 33 along signal lines H and V, respectively. Deflection unit 33 generates horizontal and vertical deflection signals for deflection windings 34 of a color picture tube 35.

The digitized video signal produced by A/D converter 25 is applied to an input of a digital comb filter 26 that is clocked at the $4f_{sc}$ rate. Comb filter 26 produces a separated digital luminance signal which is applied along a data line to a luminance signal processor 32. Luminance processor 32 takes the digitized luminance signal and processes it in accordance with various control signals inputs, such as a viewer controlled contrast control not illustrated in FIG. 1, and produces a processed luminance signal that is applied to the inputs of a digital-to-analog (D/A) converter 40c. The luminance signal at the output of D/A converter 40C, now in analog form, is filtered by a low pass filter 41c to remove the sampling frequency components, and a processed luminance signal Y' is applied to an input of a picture tube driver stage 44.

Comb filter 26 also produces a separated digital chrominance signal which is applied to the input of a chrominance processor 31. Chrominance processor 31 may include a chrominance amplifier, not illustrated in FIG. 1, that amplifies the chrominance signal in response to viewer controlled color saturation control signals and a chroma digital peaker, also not illustrated in FIG. 1, which modifies the response characteristics exhibited by the chrominance signal to compensate for any undesirable response characteristics of the intermediate frequency circuitry 23.

The processed chrominance signals are then applied to an I-Q demodulator 36. Operation of I-Q demodulator 36 is synchronized by I and Q clock signals from clock generator 27 to demodulate the chrominance signal into its baseband digital I and Q color mixture signal components. The demodulated I signal is applied to an input of a finite impulse response (FIR) filter 37 and the demodulated Q signal is applied to the input of a different FIR filter 38. The I filter 37 has a passband extending from 0 to approximately 1.5 MHz, and the Q filter has a passband extending from 0 to 0.5 MHz. The I and Q filters remove high frequency noise that may be contained in the color signals because of the relatively broad bandwidth of the preceding circuitry of the I and Q processing channels.

The filtered, digital I and Q signals are converted to analog signals by D/A converters 40a and 40b, respectively. The analog signals are then filtered by low pass filters 41a and 41b to remove sampling frequency components. The resultant I' and Q' signals are applied to respective input terminals of driver stage 44.

The operation of digital signal processing circuitry thus far described is explained in greater detail in the U.S. patent application Ser. No. 383,290, filed May 28, 1982, entitled CLOCK GENERATION APPARA- TUS FOR A DIGITAL TELEVISION SYSTEM, by H. G. Lewis, Jr., hereby incorporated by reference.

Driver stage 44 includes an analog color matrix 39 of conventional design to which the analog I', Q', and Y' signals are applied through respective buffers 42a–42c to develop the conventional RGB signals representing red, green and blue picture information. The RGB signals are amplified by driver amplifiers 43 and coupled to the various cathode electrodes of an image display device, such as a picture tube 35, to produce a display of the color picture information contained in the composite video signal.

A feature of the invention is the use of a digital-to-analog converter in a digital signal processing system for a television receiver that is capable of having its output signal level maintained, placed, set, or reset upon command to a predetermined level. Such a capability permits, for example, horizontal and vertical blanking of the screen of color picture tube 35 using digital techniques rather than the conventional technique of an analog input signal to the driver stage 44.

As illustrated in FIG. 1, sync separator 28 develops a composite sync signal that is applied to a blanking pulse generator 29 which develops along a signal line BL blanking pulses of duration equal to the horizontal and vertical blanking intervals.

The blanking pulses on signal line BL are applied through respective pulse delay circuits 30a, 30b, 30c to the reset input terminals of respective D/A converters 40a, 40b, 40c. Upon receipt of the negative-going edge of the blanking pulses at their reset terminals, D/A converters 40a, 40b and 40c, establish their output voltages at predetermined levels for the duration of the pulse. For example, if the output range of the D/A converter is between 0 volts and −1 volt, resetting the D/A converter will result in the output voltage being maintained at, for example, the 0 volt level.

With the output levels of the three D/A converters 40a, 40b and 40c during the horizontal and vertical blanking intervals being maintained at 0 volts, the analog voltages I', Q', and Y' are also set to the 0 volt level. Buffer stages 42a, 42b, 42c are designed so that a 0 volt input to each, when appropriately level shifted and inverted, produces voltages on signal lines R, G and B that cut off the driver amplifiers in driver amplifier circuit 43 to produce cutoff of the cathode electrodes in color picture tube 35. The cutoff of the cathode electrodes produces a blank screen for the duration of the horizontal or vertical blanking interval.

It is particularly advantageous to digitally provide for blanking as inventively taught, in that it may be desirable to provide a blanking capability near the end of the digital signal processing chain rather than near the beginning, such as at a point near the operation of A/D converter 25. If blanking information is introduced into the luminance and chrominance digital signals early in the processing chain, processing circuitry further along may erroneously change these digital signal to ones that are incapable of producing correct blanking levels for the Y', Q', and I' analog signals.

Delay circuits 30a–30c are provided to enable the blanking signal levels to be developed substantially simultaneously on the I', Q' and Y' output lines. Because the luminance and color mixing information I, Q and Y are processed in different data channels, the processing delays introduced by the different channels will differ for the I, Q and Y information. Furthermore, because the bandwidth for the I', Q' and Y' signals differ from about 4.5 MHz for the Y' signal to about 0.5 MHz for the Q' signal, the group delays introduced by low pass filters 41a–41c differ. The delay circuits 30a–30c are designed to take all these delays into account so as to initiate the blanking portion of the I', Q' and Y' output signals at substantially the same time.

An example of a D/A converter with reset capability for use in accordance with the teachings of the invention is the 10-input bit D/A converter manufactured by TRW Corporation, Redondo Beach, Calif., model TDC 1016J. In the TTL input mode of operation, this D/A converter may be used so that pin 11 is the functional equivalent of the reset input terminal of FIG. 1.

Figure 2:
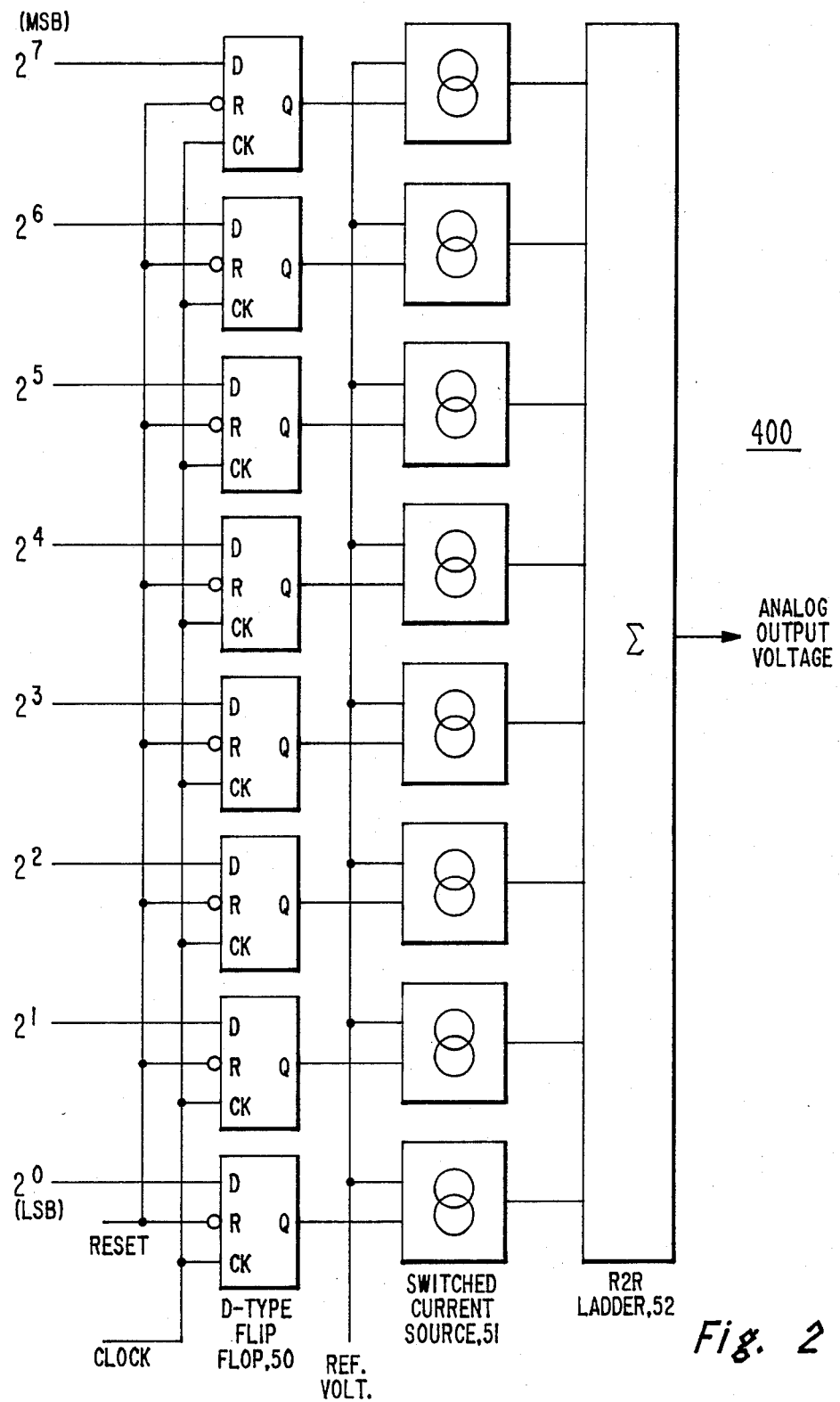
FIG. 2 illustrates a specific embodiment of the digital-to-analog converter of FIG. 1.

Alternatively, the D/A converter 400 illustrated in FIG. 2 may be used as any one of the D/A converters 40a–40c of FIG. 1. D/A converter 400 is an 8-bit converter, since the digital signal processing circuit of FIG. 1 requires the quantization of composite video signal to no more than 256 levels. To keep the signal to noise ratio high, D/A converter 400 is run in the zero order hold mode by using eight data type flip-flops 50. Each of the input bits $2^0$–$2^7$ of the corresponding digital output sample is applied to a respective D input terminal of a responsive one of flip-flops 50. The 8-bit data is strobed into the D flip-flops upon receipt of a clock pulse from clock generator 27 of FIG. 1 along a CLOCK signal line that is coupled to each of the clock input terminals of flip-flops 50. The Q output terminals of the flip-flops 50, representative of the received data, are coupled to a respective one of eight switched current sources 51. The outputs of switched current sources 51 are coupled to a summing network 52, such as a conventional R2R ladder, to produce an analog output voltage whose value is a functional of the digitized signal level represented by the 8-bits $2^0$–$2^7$.

The negative-going horizontal and vertical blanking pulses after suitable delay are applied along a RESET line of FIG. 2 to the R, RESET, input terminals of the D flip-flops 50 to produce a logical 0 output state at each of the Q output terminals. A logical 0 at each of the Q output terminals produces at the output of the ladder network 52 a substantially zero analog output voltage. The zero analog output voltage for D/A converter 400 results in zero I', Q', Y' voltages at the outputs of low pass filters 41a–41c.

Other types of D flip-flops may be used in D/A converter 400 of FIG. 2. For example, D flip-flops having output enable terminals rather than reset terminals may be used. The blanking pulses are then applied to the output enable terminals to keep the Q outputs low during the blanking pulse interval.

FIG. 3 illustrates a portion of the circuitry of FIG. 1 wherein a color kill capability is provided when using a digital to analog converter having a reset capability. Elements of FIGS. 1 and 3 identified the same, function in a similar manner. In FIG. 3 the blanking signal line BL is directly connected to the delay circuit 30c that is interposed between blanking generator 29 and the reset input terminal of the luminance channel D/A converter 40c. Blanking line BL is also directly connected to an input terminal of an AND gate 45. At the other input terminal of AND gate 45 there is applied a color kill signal K obtained from conventional analog circuitry or from the color kill circuitry of the digital signal processing portion of the television receiver. In a digital signal processing system, the color kill signal K may be derived in the chrominance processor 31 of FIG. 1 in the manner detailed in U.S. patent application Ser. No.

359,433, filed Mar. 18, 1982 entitled DIGITAL TELEVISION RECEIVER AUTOMATIC CHROMA CONTROL SYSTEM by H. G. Lewis, Jr. and S. M. Elescu, now U.S. Pat. No. 4,447,826, hereby incorporated by reference. Color kill signal K remains in its low state as long as it is desired to display only luminance information.

The output terminal of AND gate 45 is connected to the input terminals of delay circuits 40a and 40b that are in turn coupled to the reset terminals of the I D/A converter 40a and the Q D/A converter 40b. Thus, upon the occurrence of the negative-going color kill signal K the output of AND gate 45 goes low resulting in the resetting of D/A converters 40a and 40b resulting in a zero output voltage level for the I' and Q' signals. Only the luminance information is applied to driver stage 44 to produce a black and white picture display.

What is claimed is:

1. In a television display system wherein drive signals containing luminance and chrominance representative information, derived from a plurality of analog output signals are applied to various ones of the electrodes of a color picture tube for producing a picture display, a digital signal processing system for developing said analog output signals and for placing selective ones of said analog output signals in predetermined states, comprising;

means for developing an input signal containing color picture information;

means for developing a plurality of signal bit groups representative of said input signal;

a luminance processor responsive to said plurality of signal bit groups for developing a plurality of signal bit groups representative of the luminance information contained in said color picture information;

a chrominance processor responsive to the first mentioned plurality of signal bit groups for developing a plurality of signal bit groups representative of the chrominance information contained in said color picture information;

a digital-to-analog converter arrangement responsive to the signal bit groups developed by said luminance and chrominance processors for developing a plurality of analog output signals representative of said luminance and chrominance information;

a driver stage of said display system receiving said plurality of analog output signals for developing said drive signals to produce a display that contains said color picture information;

means for developing a control signal; and means coupled to said digital-to-analog converter arrangement and responsive to said control signal for placing selected ones of said analog output signals in predetermined states.

2. A digital signal processing system in accordance with claim 1 wherein said input signal includes a first interval within which said color picture information is contained and a second interval within which said display is to be blanked, said control signal indicating the occurrence of said second interval, said plurality of analog output signals being placed during said second interval in those states that will produce a blank display.

3. A digital signal processing system in accordance with claim 1 wherein said chrominance processor develops first and second bit groups representative of first and second color mixing information, said digital-to-analog converter arrangement developing first and second analog color mixing output signals representative of said first and second color mixing information respectively, said control signal when developed resulting in said first and second analog color mixing signals being placed in those states that will produce a display containing only luminance information.

4. A digital signal processing system in accordance with claim 3 wherein said digital-to-analog converter arrangement develops a third analog output signal representative only of said luminance information and including means for developing a blanking signal, said analog output signal placing means being responsive to said blanking signal for placing the three analog output signals in those states that will result in a blank display.

5. In a television display system wherein drive signals containing luminance and chrominance representative information, derived from a plurality of analog output signals are applied to various ones of the electrodes of a color picture tube for producing a picture display, a digital signal processing system for developing said analog output signals and for placing selective ones of said analog output signals in predetermined states, comprising:

means for developing an input signal containing color picture information;

means for developing a plurality of signal bit groups representative of said input signal;

a luminance processor coupled to said analog to digital converter for developing a plurality of signal bit groups representative of the luminance information contained in said color picture information;

a chrominance processor coupled to said analog to digital converter for developing a plurality of signal bit groups representative of the chrominance information contained in said color picture information;

a digital-to-analog converter arrangement responsive to the signal bit groups developed by said luminance and chrominance processors for developing a plurality of analog output signals representative of said luminance and chrominance information;

means responsive to said plurality of analog output signals for developing said drive signals to produce a display that contains said color picture information;

means for developing a control signal; and means coupled to said digital-to-analog converter arrangement and responsive to said control signal for placing selected ones of said analog output signals in predetermined states, wherein said analog output signal placing means includes a plurality of flip-flops, each flip-flop having applied to an input terminal thereof a corresponding bit from an associated signal bit group, and wherein said digital-to-analog converter arrangement includes a summing network coupled to output terminals of said plurality of flip-flops for developing an analog output signal, the magnitude of which is represented in binary form by said associated signal bit group, a signal line coupled to a terminal of each of said plurality of flip-flops receiving said control signal for producing a predetermined logical state at each of said output terminals.

6. In a television display apparatus having a digital signal processing system for producing analog output signals from digitally supplied information signals to obtain a drive signal for an image display device, a digital signal processing system with color kill capability, comprising:

means for supplying digital samples containing image information including a luminance processor for generating luminance information representative digital samples and a color processor for generating color information representative digital samples;

a digital-to-analog converter arrangement responsive to said digital samples for producing a first analog output signal containing color information of said image information and a second analog output signal containing luminance information of said image information;

a driver stage for said display device receiving said analog output signals for developing said drive signal to generate a display of said image;

means for developing a color kill control signal; and means responsive to said color kill control signal and coupled to said digital-to-analog converter arrangement for establishing said first analog output signal at a predetermined level that results in the removal of color information from said display.

7. The system of claim 6 wherein said image information is contained in picture intervals occurring between second intervals within which said display is to be blanked, said system including means for developing a blanking control signal that when applied to said analog output signal establishing means results in the two analog output signals being established at levels that result in the production of a blank display.

8. The system of claim 6 wherein said color processor develops first and second bit groups representative of first and second color mixing information respectively, said digital-to-analog converter arrangement developing said first and a third analog output signal representative of said first and second color mixing information respectively, said control signal when developed resulting in said first and third analog output signals being placed in those states that will produce a display containing only luminance information.

9. The system of claim 8 wherein said digital-to-analog converter arrangement develops said second analog output signal representative only of said luminance information and includes means for developing a blanking signal, said analog output signal establishing means being responsive to said blanking signal for placing the three analog output signals in those states that will result in a blank display.

10. In a television display apparatus having a digital signal processing system for producing analog output signals from digitally supplied information signals to obtain a drive signal for an image display device, a digital signal processing system with color kill capability, comprising:

means for supplying digital samples containing image information including a luminance processor for generating luminance information representative digital samples and a color processor for generating color information representative digital samples;

a digital-to-analog converter arrangement responsive to said digital samples for producing a first analog output signal containing color information of said image information and a second analog output signal containing luminance information of said image information;

means responsive to said analog output signals for developing said drive signal to generate a display of said image;

means for developing a color kill control signal; and means responsive to said color kill control signal and coupled to said digital-to-analog converter arrangement for establishing said first analog output signal at a predetermined level that results in the removal of color information from said display, wherein said analog output signal establishing means includes a plurality of latches each latch having applied to an input terminal thereof a corresponding bit from an associated digital sample, and wherein said digital-to-analog converter arrangement includes a summing network coupled to output terminals of said plurality of latches for developing an analog output signal, the magnitude of which is represented in binary form by said associated digital sample, and a signal line coupled to a terminal of each of said plurality of latches receiving said control signal for producing a predetermined logical state at each of said output terminals independent of the state of said digital sample at the time said control signal is being developed.

* * * * *